(12) United States Patent
Shibuya

(10) Patent No.: US 6,985,609 B2
(45) Date of Patent: Jan. 10, 2006

(54) METHOD FOR IDENTIFYING AN OBJECT IMAGE

(75) Inventor: Satoru Shibuya, Kyoto (JP)

(73) Assignee: Giken Trastem Co., Ltd., Kyoto (JP)

( * ) Notice: Subject to any disclaimer, the term of this patent is extended or adjusted under 35 U.S.C. 154(b) by 561 days.

(21) Appl. No.: 09/940,956

(22) Filed: Aug. 28, 2001

(65) Prior Publication Data
US 2002/0025073 A1  Feb. 28, 2002

(30) Foreign Application Priority Data
Aug. 30, 2000  (JP) .............................. 2000-260705

(51) Int. Cl.
*G06K 9/00*  (2006.01)
(52) U.S. Cl. ...................... 382/118; 382/103; 382/181; 382/280; 382/291; 348/135; 348/136
(58) Field of Classification Search ................ 382/103, 382/176, 173, 291, 181, 199, 190, 201, 203, 382/118, 282, 276, 280
See application file for complete search history.

(56) References Cited

U.S. PATENT DOCUMENTS

| | | | | |
|---|---|---|---|---|
| 5,740,274 A | * | 4/1998 | Ono et al. .................. | 382/190 |
| 5,764,786 A | * | 6/1998 | Kuwashima et al. ........ | 382/107 |
| 6,072,889 A | * | 6/2000 | Deaett et al. ................ | 382/103 |
| 6,332,038 B1 | * | 12/2001 | Funayama et al. .......... | 382/190 |
| 6,453,069 B1 | * | 9/2002 | Matsugu et al. ............ | 382/173 |
| 6,674,905 B1 | * | 1/2004 | Matsugu et al. ............ | 382/199 |

* cited by examiner

*Primary Examiner*—Samir Ahmed
*Assistant Examiner*—Brian Le
(74) *Attorney, Agent, or Firm*—Koda & Androlia

(57) ABSTRACT

A method for identifying the position, quantity, kind, etc. of an object. A Standard Object image is positioned on a picture so as to be around an arbitrary point (Arrangement Point), normal vector group is determined along the outline of the Standard Object image based upon the density difference in the background and the Standard Object, and an angle information and a position information are determined from the Arrangement Point to the normal vector group, so that such information are stored as standard data for the arrangement point. On the other hand, normal vector group is determined on the outline of an object image, which is to be recognized, based upon the density difference in the background and the object image so that, based on the standard data, a plurality of Answer points are determined. Lastly, a focus point region formed by the Answer points is evaluated.

3 Claims, 13 Drawing Sheets

METHOD FOR IDENTIFYING AN OBJECT IMAGE

BACKGROUND OF THE INVENTION

1. Field of the Invention

The present invention relates to a method for identifying an object image by way of differentiating the object image from a background image. More particularly, the present invention relates to a method for identifying an object image in which a normal line direction of an outline portion of an object image is determined, and humans, vehicles, vegetables, etc. are classified and recognized in real time.

2. Prior Art

Conventionally, for the Texture Analysis, a Fourier transformation is utilized to analyze a two-dimensional grayscale picture. The Fourier transformation for the pictures is generally used to analyze the state of the surface of the object image shown in the picture.

In such an analysis, a picture is divided into square regions, a Fourier transformation is performed on the image data of the respective square regions, and crystal lattice direction, defects, etc. of the object image are analyzed based upon the obtained phase. In this case, a Fourier transformation is performed on the square regions; accordingly, the obtained phase becomes a vertical or horizontal directional vector of the square region. Accordingly, when, with this method, recognizing an object image with an un-specific form in the picture, a need for an even greater calculation to determine the normal line direction of the outline portion of the object image is required. Moreover, since the picture is divided into squares, depending on the position of the boundary of the picture and on the position where the square is arranged, the normal vector of the object image may not be obtained accurately. In order to reduce this disadvantage, a window function is applied on the outer part of the square region so as to lighten the weight. However, this results in that the calculation time becomes longer.

On the other hand, in an image processing in real time, when recognizing an indefinite shaped moving object image such as an individual, a differential image or a phase difference of the current image and the prior image is utilized. This prior method estimates the number of people, etc. based on the area of the region detecting a density difference more than a set level from the differential image, etc. However, in this method, since the recognition of the object images is determined based on an area size, it is unavoidable to incorrectly recognize an object image. For instance, it may recognize one large person as two people, and two small people moving in the same direction side by side as one person.

SUMMARY OF THE INVENTION

Accordingly, the object of this present invention is to provide a method for identifying an object image that identifies, using density differences in the background image and the object image in a picture, the position, quantity, kind and the like of an object image more quickly and more easily.

The above-object is accomplished by the unique steps of the present invention for an object image identifying method, and the steps comprises:

arranging a Standard Object image on a picture in which an arrangement point that is an arbitrary point on the picture that shows a background image is used as a reference point;

determining a normal vector group on the outline portions of the Standard Object image based upon density differences in the background image and the Standard Object image;

determining an angle information of the respective normal vectors and determining the position information from the arrangement point to the respective normal vectors of the normal vector group;

storing the position information and angle information as standard data for the arrangement point;

determining, for a picture that shows an object image to be recognized, a normal vector group on the outline portions of the object image based upon density differences in the object image and a background image;

determining a plurality of Answer point groups, which correspond to the arrangement points, from the normal vector group based upon the standard data; and evaluating a focus point region formed by the Answer point group.

In the above method, the normal vector group can be substituted with a tangent line group, and the normal vector can be substituted with a tangent line.

According to the above method, the normal vector group is determined based upon the density differences in the Standard Object image and the background image; accordingly, the normal vector group represents the Standard Object image. In addition, the standard data consists of the angle information of the respective normal vectors and the position information from the arrangement point of the Standard Object to the respective normal vectors of the normal vector group; accordingly, the standard data specifies the Standard Object image for the arrangement point on the picture.

Furthermore, from the normal vector group of the object image to be recognized, the Answer point group, which is the arrangement point based on the standard data, is determined. In other words, the Answer point, which is the same as the arrangement point, is determined from the angle information and position information of the standard data for the respective normal vectors of the normal vector group in the object image. As a result, a plurality of Answer points for every normal vector is made in the region wherein the center is the arrangement point.

In addition, for the evaluation of the focus point region formed from the plurality of Answer points, if the percentage, for instance, of the Answer points which gather in the focus point region is more than a predetermined value, then an object image that has the identity of the Standard Object image is recognized.

Moreover, with the use of this kind of normal vector, even if the brightness and darkness of the whole picture changes, the relative density difference in the object image and background image does not change. Accordingly, the object image and the background image are differentiated accurately and reliably.

The above method may include the steps of:

dividing the Standard Object image into two or more parts and then making each divided Standard Object image for the same number of standard data for the divided parts;

determining the Answer point group of every standard data for the object image to be recognized and then making the same number of MAP screens which are the Answer point groups determined for every standard data; and forming an evaluation screen that is comprised of the respective MAP screens formed into one screen and then evaluating the focus point region formed from the Answer point groups in the evaluation screen.

In this method, the Standard Object image is divided into two or more parts. Accordingly, a standard data can be made for the respective Standard Object image divided for every part shaped differently. In addition, for the parts with different shapes, by way of processing the picture showing the object image to be recognized for each plurality of standard data, even if the outline shape of the whole object image to be recognized does not match the whole Standard Object image, the consistency of each part improves. Accordingly, for the object image, all the Standard Object images divided will be identified; and if all the divided Standard Object images exist in the object image, it is recognized that an object image, which has the same identity as the Standard Object image, exists. For example, for humans, the outline shape of the head and the upper body differ, and the actual human (object image to be recognized) may be bigger or smaller than the Standard Object image; thus, it is difficult to make complete matches. In such cases, though there are some inconsistencies, by way of being based on the standard data divided for each part that is shaped differently, if the object image has a head and an upper body, it is identified as an object image identical to the Standard Object image.

In addition, the present invention may include the steps wherein, of the normal vector groups obtained from the picture, the normal vectors that have a vector direction that is unchangeable for a long period of time are considered to be originated from the background image; and the normal vector groups that are unchangeable for a long period of time are removed, and the Answer point group is determined from the remaining normal vector groups. In this method, based upon the background processing that is performed on the pictures showing the Standard Object image and the object image to be recognized, only the normal vectors, which originate from the object image, are obtained. Therefore, the noise from the background is reduced, and an identifying of the object is accomplished in high precision. In addition, when the object image data is formed, the time of calculation can be shortened and the needed memory storage capacity can be reduced; and the calculation time of the Answer point groups can be also shortened.

As described above, according to the present invention, the Answer point group of the normal vector group for the outline portion of the object image is determined according to the standard data for the arrangement point of the Standard Object image; and this the Answer point is evaluated. Thus, the position, quantity and kind of the object image shown in the picture can be identified quickly and easily when the Standard Object image is taken as a specific object that has a characteristic outline such as a human, vehicle, vegetable, etc.

Also, by evaluating the Answer point group for each one of the plurality of MAP screens, the object image to be recognized is analyzed for each individual part thereof. Accordingly, the position, quantity and kind of the object image in the picture can be identified with even more reliability.

Moreover, by way of removing the normal vector group or the tangent line group for the background image in advance, the calculation time for the object image data can be shortened, the memory storage capacity is reduced, and the calculation time of the Answer point group can be reduced.

BRIEF DESCRIPTIONS OF THE DRAWINGS

FIG. 1 is a diagram showing the picture converted into digital data;

FIGS. 2(a) through 2(c) are diagrams showing an image of the fundamental wave Fourier transformation, in which FIG. 2(a) shows a circle placed on the boundary of the object image and the background image, and from the base line, the points in the counter clockwise direction are marked, FIG. 2(b) shows the sine wave, cosine wave, s·p waveform and c·p waveform when the base line direction is 0 degree angle, and FIG. 2(c) shows the result of the phase direction;

Figure 10A:
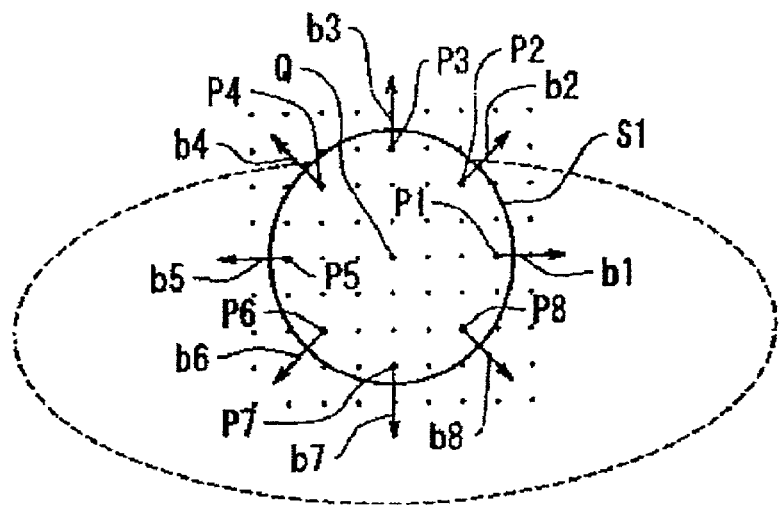
Figure 10B:
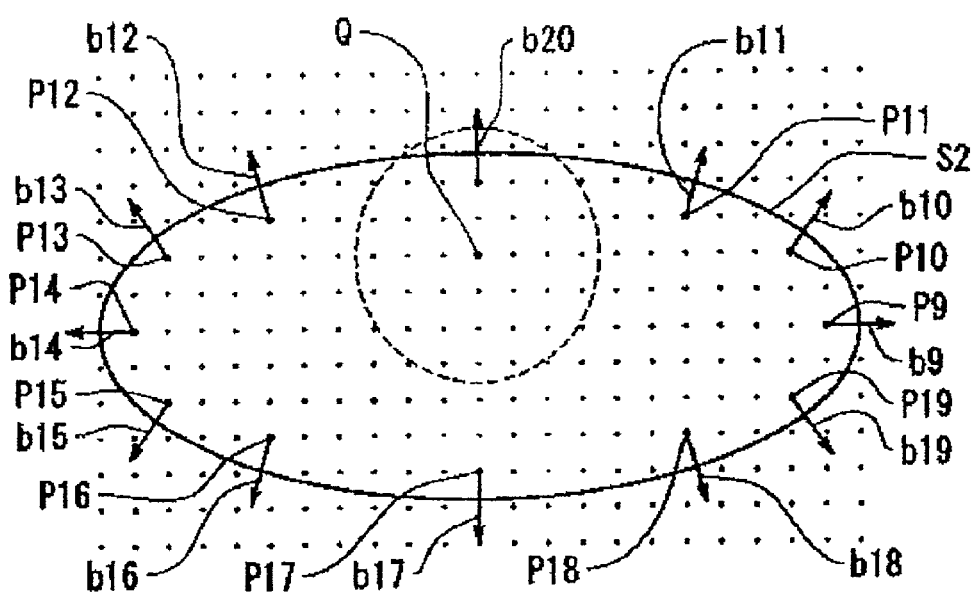
Figure 11:
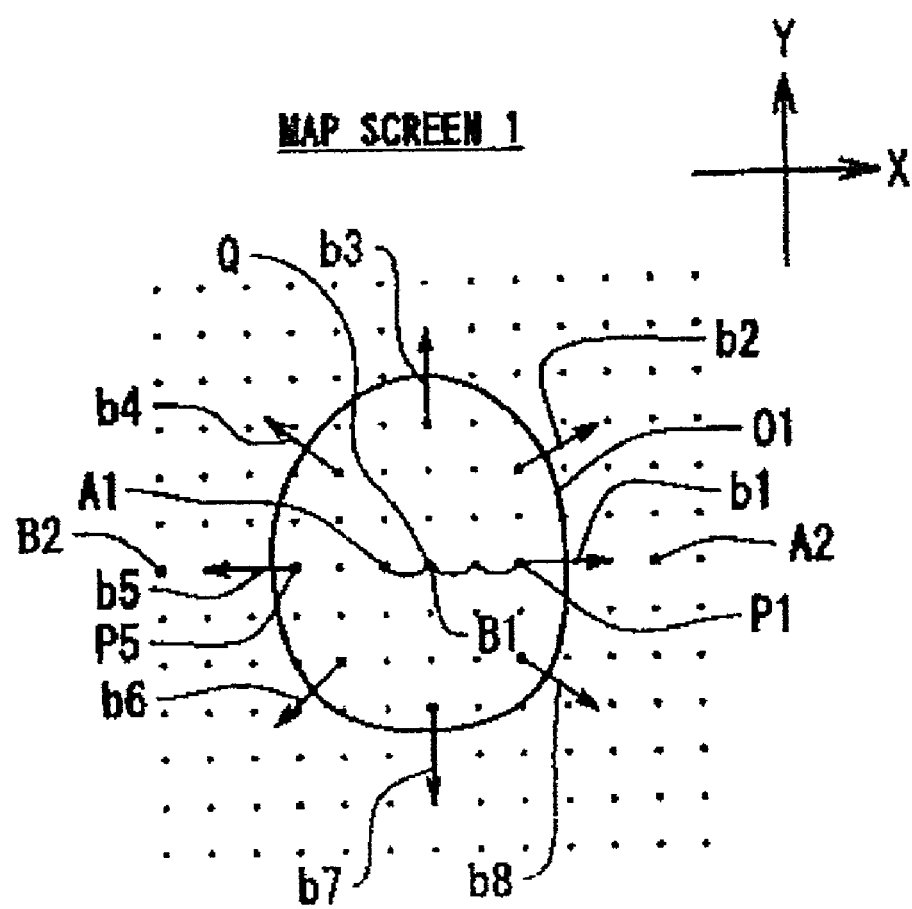
Figure 12:
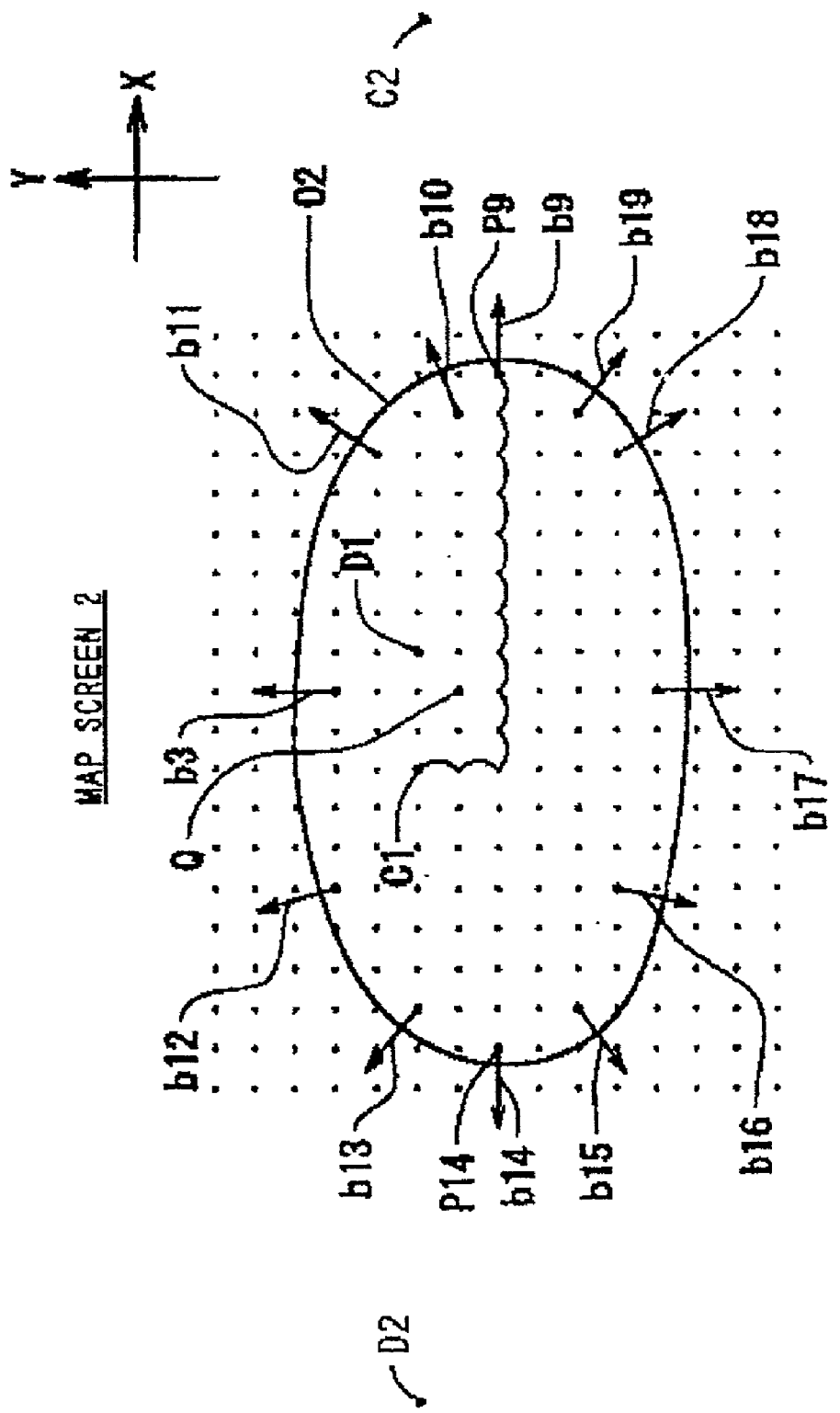
Figure 13:
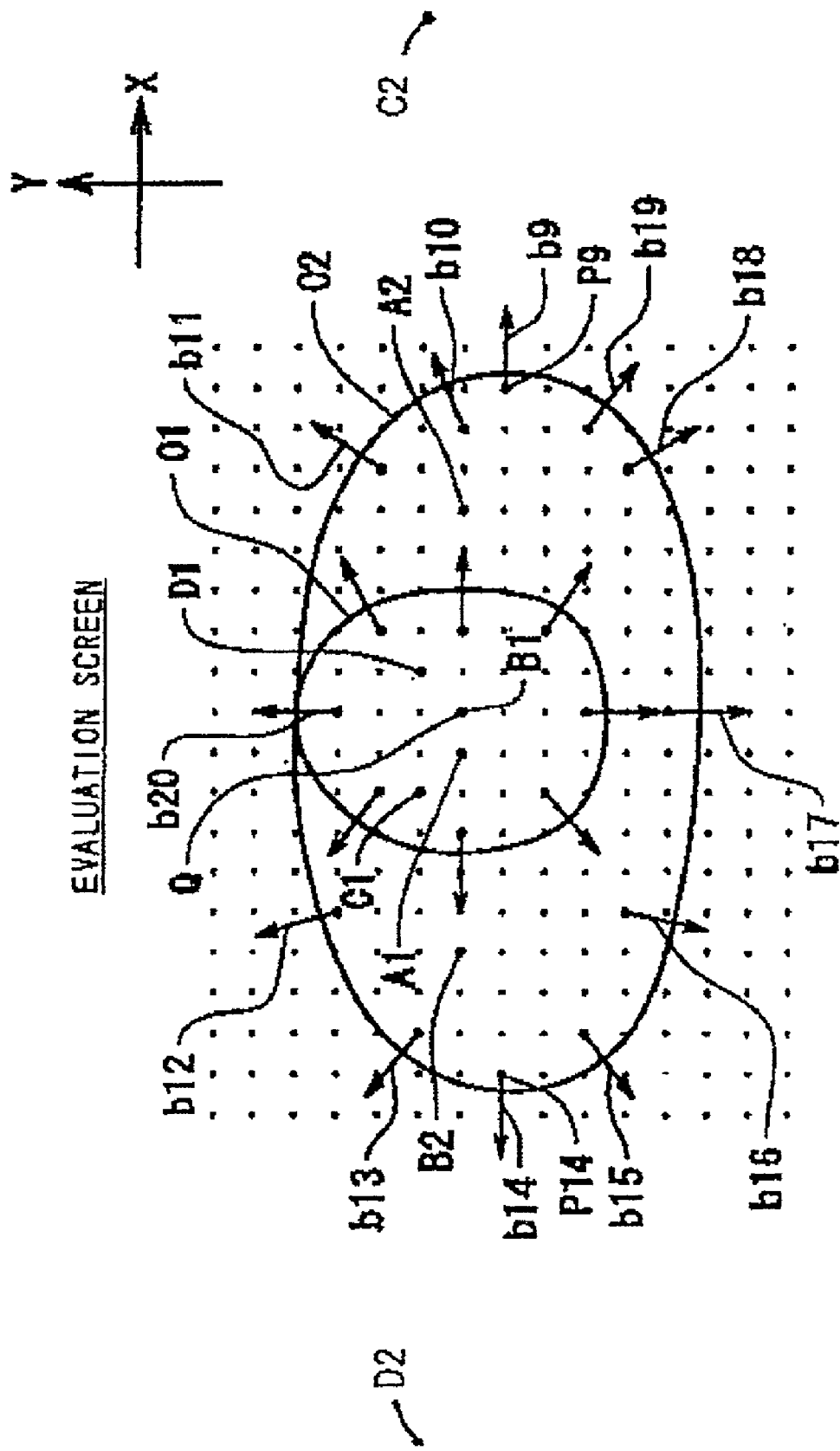

FIGS. 10(a) and 10(b) are diagrams showing the standard normal vectors of the divided Standard Object image;

FIG. 11 shows a MAP screen 1 with the Answer point group of the head of the object image added;

FIG. 12 shows a MAP screen 2 with the Answer point group of the upper body of the object image added; and FIG. 13 shows an evaluation screen of MAP screen 1 and MAP screen 2 combined.

DETAILED DESCRIPTION OF THE INVENTION

The embodiments of the present invention will be described below.

First Embodiment

The object image identifying method of the First Embodiment determines the normal vector for the outline portion of an object image by using the density difference between the object image and the background image in a picture converted into digital data and then identifies the object image based on the determined normal vector.

1. Method for Determining Normal Vector

First, the method to determine the normal vector will be described.

Figure 1:
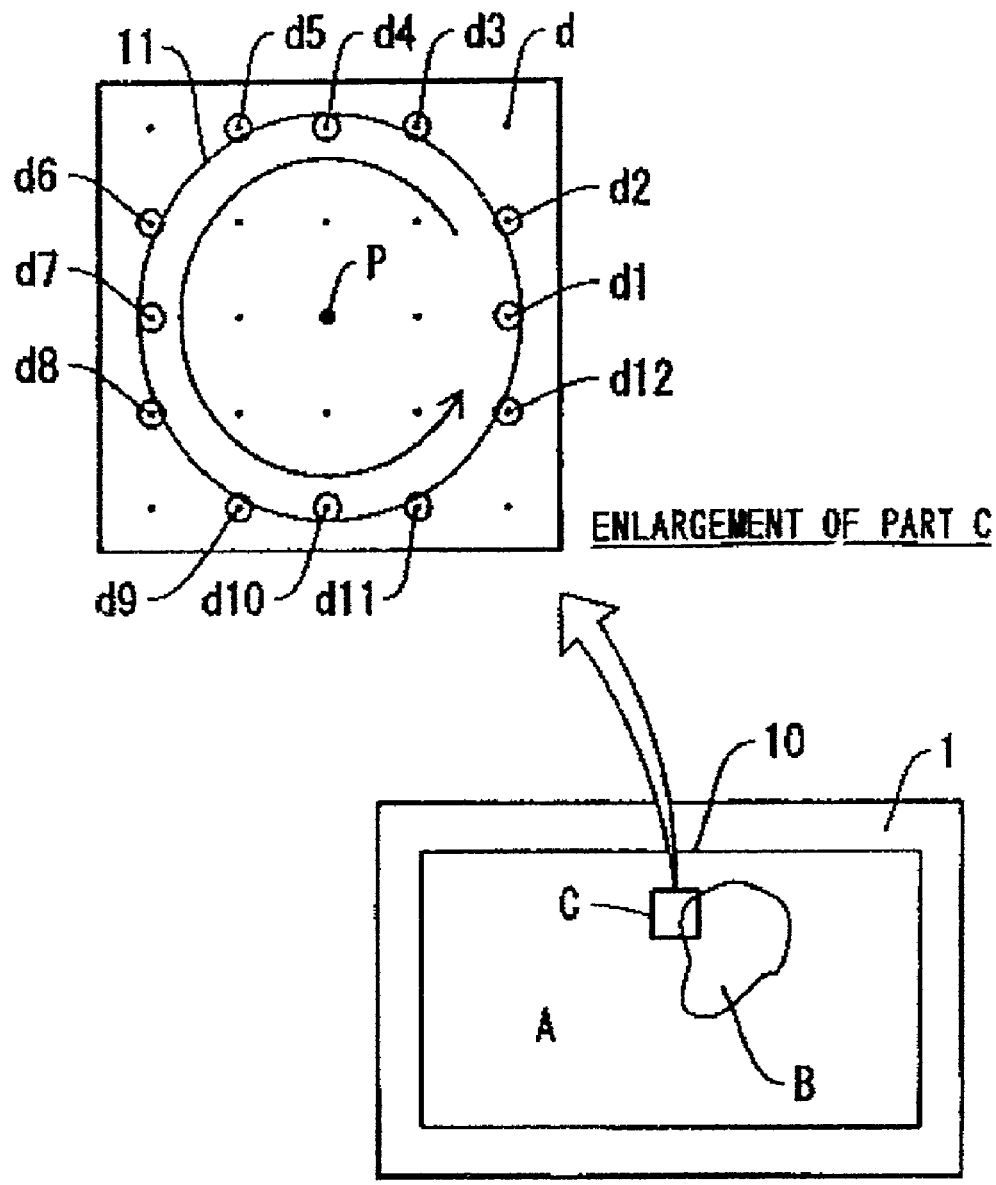

As shown in FIG. 1, points p are arranged at equal intervals on a picture 1. In other words, for the necessary regions 10 (generally the entire image region) on the picture 1, points p are arranged so that for instance two (2) pixels apart horizontally and vertically. These points p can be predetermined fixed points. In FIG. 1, d, d1 through d12 and p all indicates pixels. The picture 1 can be a screen of, for instance, 320 pixels horizontally and 240 pixels vertically. For these respective pixels, when an object image is shown on the picture, the image density differs in brightness from, for example, 0 through 255 (256 level).

Next, a fundamental wave Fourier transformation is applied on the pixel value of each pixel on the circumference of a circle 11 whose center is point p. For instance, for the circle 11, a circle with a radius of two (2) pixels is drawn, and a fundamental wave Fourier transformation is performed on each 12 points (d1 through d12) on the circumference of this circle.

Accordingly, values SV and CV are determined by the following Equations:

$$SV = \Sigma_n d_n \cdot \sin((n-1)/N \cdot 2\pi) \qquad (3)$$

$$CV = \Sigma_n d_n \cdot \cos((n-1)/N \cdot 2\pi) \qquad (4)$$

In Equations (3) and (4), $\Sigma_n$ is the sum of n=1 through N.

In this case, there are several ways of marking points d1 through d12 on the circumference of the circle 11. For instance, start from a prescribed base line and move along the circumference and successively mark the points counter clockwise or clockwise, or apply a window function on the square region so the shape becomes a circle or a circular shape. The points can be marked in different ways. The intervals of the adjacent points p are two (2) pixels, and the radius of the circle 11 is two (2) pixels; therefore, the adjacent circles 11 overlap with two (2) pixels.

In regards to the fundamental wave Fourier transformation, as shown by the Equation (1) below, for the 12 points d1 through d12, the phase (sita) is determined from the arc tangent (ATAN) which utilizes a value (SV) that is a product sum of the sine wave of the fundamental wave Fourier transformation and a value (CV) that is a product sum of the cosine wave of the fundamental wave Fourier transformation. The "fundamental wave" refers to a sine wave and a cosine wave where the length of one period is equal to the length of the circumference which center is point p.

$$\text{sita} = \text{ATAN}(SV/CV) \qquad \text{Equation (1)}$$

The phase (sita) obtained from Equation (1) is a normal line direction (normal vector) of point p. This phase (sita) is determined for every points p that are arranged at regular intervals.

Figure 2A:
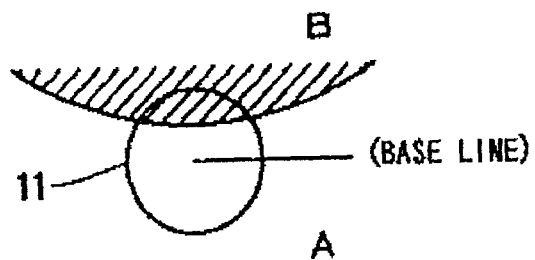
Figure 2B:
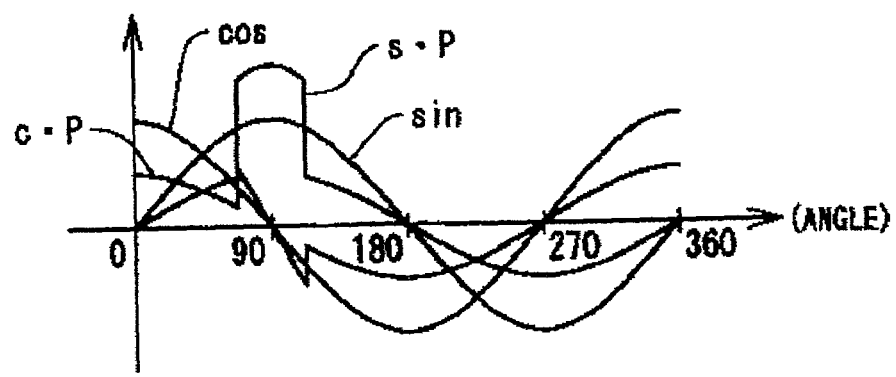
Figure 2C:
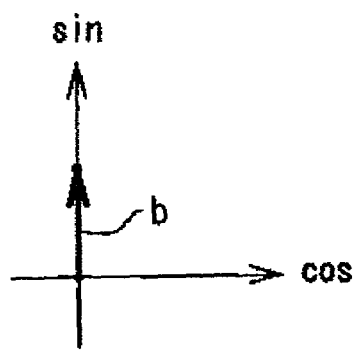

Now, when the object image B is situated so that the circle 11 overlaps on the image B as shown in FIG. 2(a), the waveform that is obtained by multiplying the respective points d1 through d12 to the sine and cosine waves of the circle 11 rotated from the base line shown in FIG. 2(a) in the counter clockwise is as shown in the FIG. 2(b). In other words, as shown in FIG. 2(b), the waveform s·p, which is a combination of the sine wave and pixel value multiplied, has a positive peak at the 90-degree angle where the object image B overlaps on the image B; and the waveform c·p, which is the cosine wave and pixel value multiplied, has a positive peak and a negative peak near the 90-degree angle. In addition, at the SV value which is the sum of the waveform s·p, a positive peak appears at the positive 90-degree angle. Since the waveform c·p has the identical peak with only the difference in positive and negative at the 90 degree angle, such a peak cancel out; and at the CV value which is the sum of this waveform c·p, the wave becomes flat. As a result, the phase obtained from the fundamental wave Fourier transformation from Equation (1) appears at the 90-degree angle shown in FIG. 2(c), and this is exactly the normal vector for the outline portion of object image B.

However, the normal vector is invalid when the image density is flat (and it is recognized as a background image A without object image B existing or as a picture inside the object image B). Thus, in order to remove points p which are below a fixed level, as shown in the Equation (2) below, when the value (pow), which is the square root of the square sum of SV or CV, is less than the fixed value, it is considered that point p does not have a normal vector. For instance, for the pictures that are obtained in the brightness value range of 0 through 255 (256 level), when the value is below the brightness value difference of 8 through 10, the above-described fixed value is set, and it is considered that there is no normal vector for the point p.

$$\text{pow} = \text{SQRT}(SV \times SV + CV \times CV) \qquad \text{Equation (2)}$$

According to the above Equation (2), it is not necessary to calculate the normal vector based upon Equation (1) for points p where the density is uniform. Therefore, the object image in the picture can be recognized more quickly and more precisely.

Figure 3:
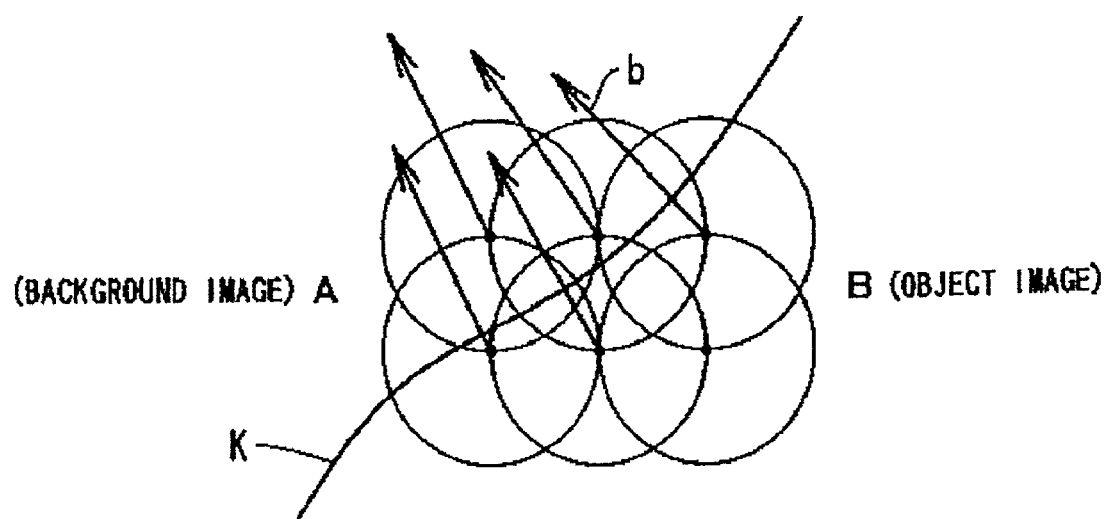
FIG. 3 is a diagram of the picture showing the normal vector b.

With the results from the Equation (1) and the Equation (2), for example, the normal vector b shown in FIG. 3 can be obtained.

The points p arranged on the picture are arranged two (2) pixels apart in both the horizontal and vertical directions. The circle 11, whose center is the respective points p, is a circle with a radius of two (2) pixels, and a fundamental wave Fourier transformation is performed on the 12 pixel values on the circumference of the circle 11, so that the adjacent respective circles 11 overlap every two (2) pixels. Therefore, the recognition of the object image can be performed in high resolution when normal vector b exists.

In this way, the existence of boundary K of the object image B and background image A on a region is recognized from the normal vector group which is the aggregate of the normal vector b of every point p arranged at equal intervals. In this method, for the normal vector b that is obtained by performing a fundamental wave Fourier transformation circularly, the precise boundary K of the object image B on picture 1 is not determined; rather, when that the normal vector group of point p which is adjacent to another point p faces in the same direction, the brightness gradient (density) of the region with a plurality of points p is considered in the normal vector group direction (see FIG. 3). Thus, since the phase that is a result of the fundamental wave Fourier transformation performed circularly is used, in other words, since the normal vector b is used, the calculation is performed more quickly and easily.

Though in the above the points p are arranged two (2) pixels apart from each other that is equally spaced on picture 1, the arrangement can be set at three (3) pixels, four (4) pixels, etc. apart. However, in regards to the circles that have the points p as the center, the radius must be set so that the circles overlap with the adjacent circle.

Furthermore, the phase is determined from the Equation (1). However, the phase can also be calculated by determining the approximate value by referring to a table based on the ratio of the SV value and CV value, which can be obtained also with sufficient precision.

Moreover, in the Equation (2), the square root of the square sum of the SV value and CV value is used; and the pow described above can be substituted for by utilizing the sum of the absolute value of the SV value and the CV value.

2. Method of Identifying an Object Image

The method of identifying an actual object image by using the above method of determining the normal vector will be described below.

In this object image identifying method, first a standard data for the Standard Object image, which is the model of the specific object image to be recognized (standard data making process), is formed. Next, the object image in the picture is evaluated based upon this standard data (object image identifying process). In the following description, a human is the Standard Object image.

(a) Standard Data Making Process

Figure 4:
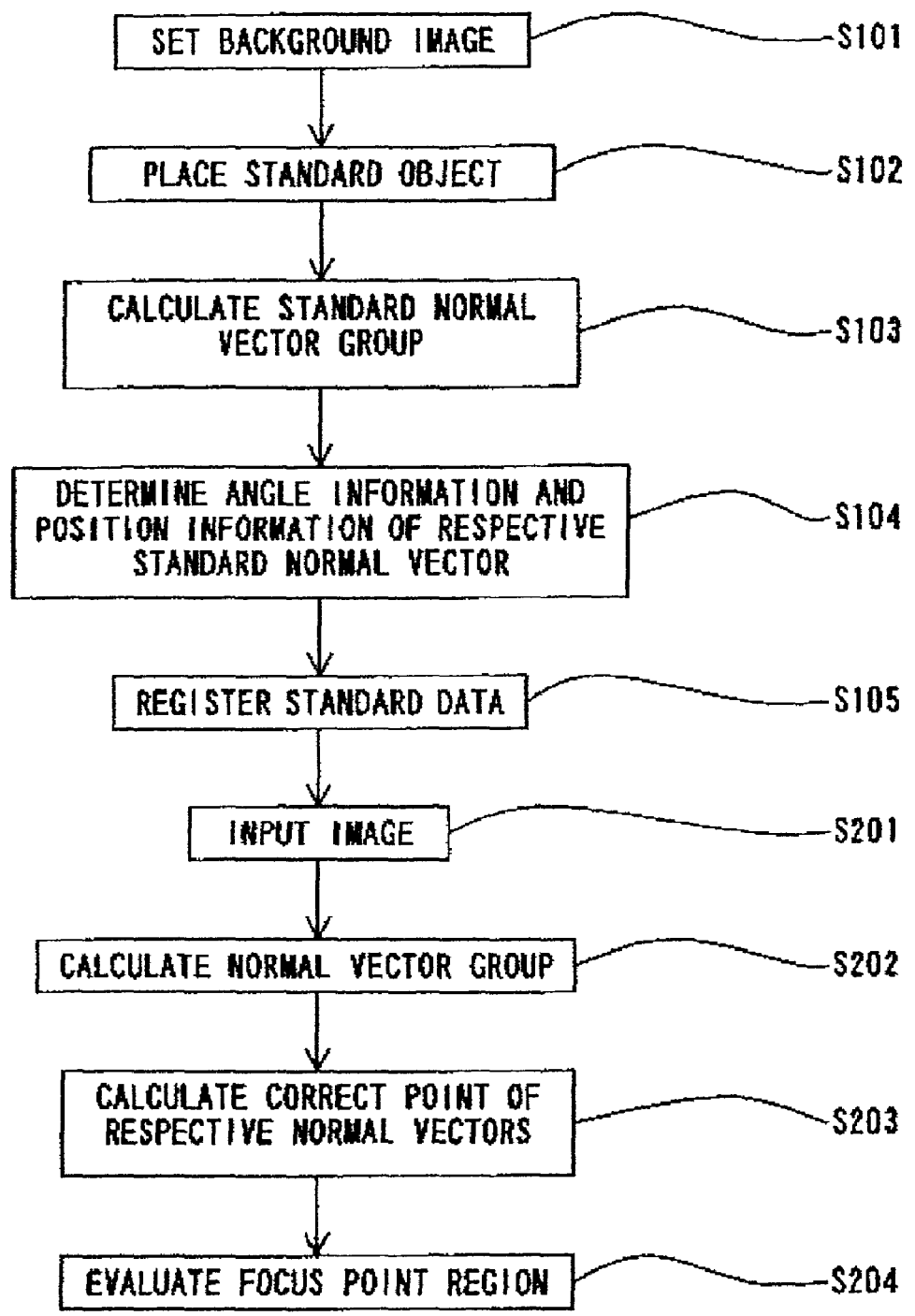
FIG. 4 is a flowchart showing the image processing procedure of the First Embodiment of the present invention.
Figure 5A:
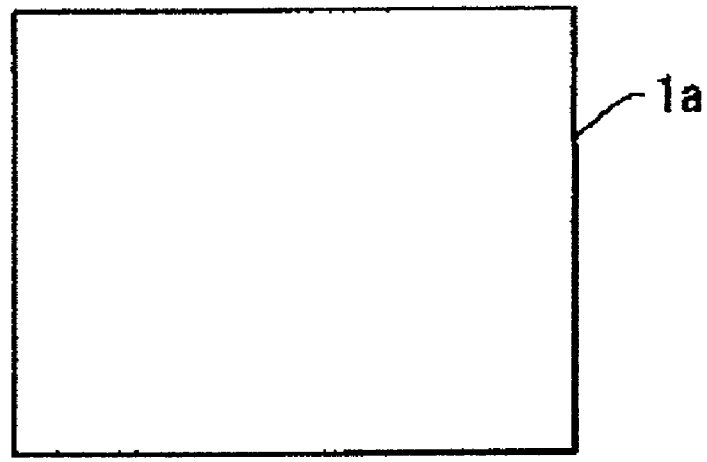
FIG. 5(a) is a diagram showing a picture with the background image.

As shown in the flowchart of FIG. 4, in step S101 of the standard data making process, the image processing is performed on picture 1a (see FIG. 5(a) which shows only the background image according to the above-described "1. Method for Determining Normal Vector". Thus, the normal vector group for the background image is determined. Almost all the pictures 1a that show the background image are fixed images (though there are some exceptions for example, a moving image which shows movement of a door opening and closing), and it does not matter whether a variety of object images exist or it is a flat image with no object image existing. The normal vector group information of such a background image is stored in the memory.

Figure 5B:
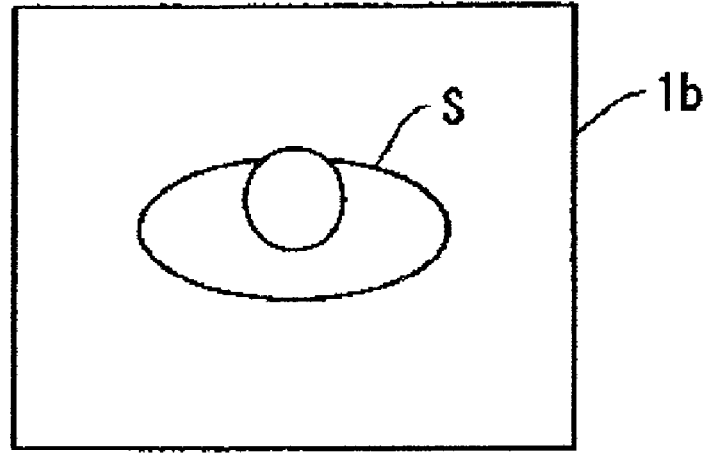
FIG. 5(b) shows a picture with the Standard Object image inserted.

Next, in step S102, one Standard Object image S, shaped as a human (see FIG. 5(b), is placed on picture 1a that shows the background image. In other words, an arbitrary point (arrangement point Q) is placed on the picture 1a, which shows the background image; and the Standard Object image S is arranged on the picture 1a, using the concerned arrangement point Q as a reference point. The Standard Object image S in FIG. 5(b) is a human viewed from above. In addition, the Standard Object image S can be typical image data made by a calculation or can be an image data of the actual object taken by a camera, etc. For the picture 1b that contains the inserted Standard Object image S (see FIG. 5(b), an image processing is performed according to the above-described "1. Method for Determining Normal Vector." Then, the normal vector group of the background image and the normal vector group of the Standard Object image S are obtained in the picture 1b in which the Standard Object image S is inserted.

Figure 6:
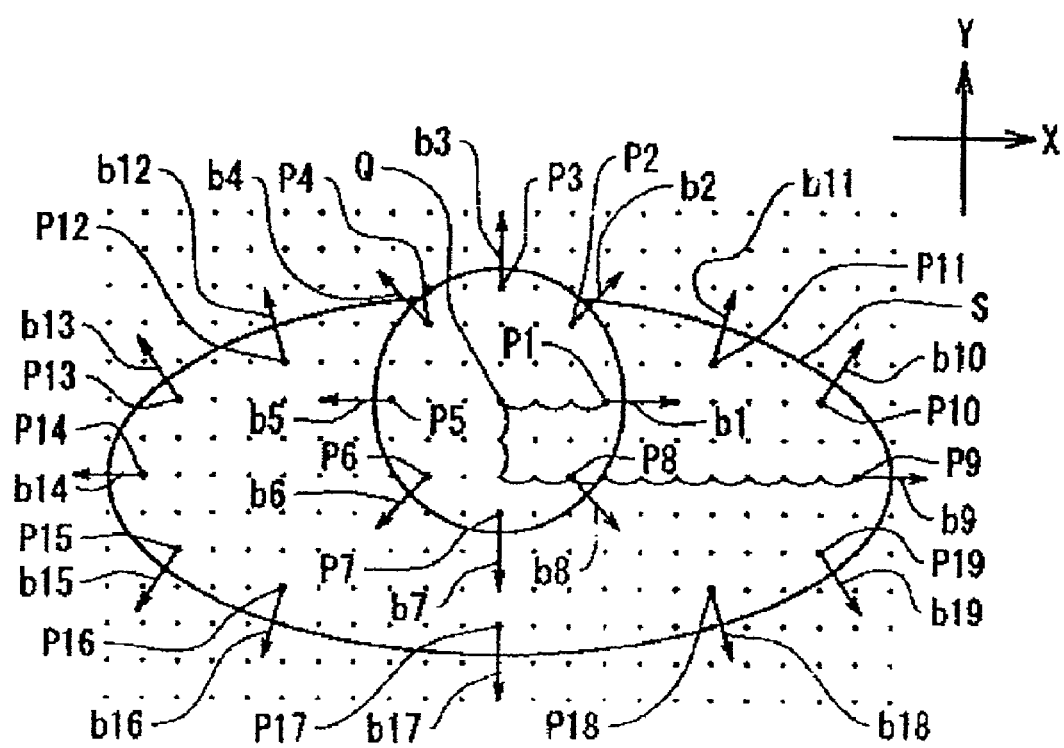
FIG. 6 is a diagram showing the standard normal vectors of the Standard Object image.

Next in step S103, the normal vector group (referred to as a "standard normal vector group") that originates only from the Standard Object image S is calculated. This is done by the background processing that uses the normal vector group information of the background image registered in the memory in step S101. In other words, for the picture 1b with the inserted Standard Object image S, all normal vector groups that are almost the same as the normal vector groups of the background image are removed. Then, all the normal vector groups originating from the background image are removed from the picture 1b that has the inserted Standard Object image S shown in FIG. 5(b). As a result, as shown in FIG. 6, the standard normal vector groups b1 through b19 that originate only from the Standard Object image S are obtained. In FIG. 6, the outer rectangular frame of the screen is omitted, and only the Standard Object image S is shown. Also, in FIG. 6, a normal vector resides for all the points when there is a brightness gradient; and only the typical vectors are shown in FIG. 6; and the same applies to FIGS. 7, 10, 11, 12 and 13. In addition, the origin of the coordinate (X=0, Y=0) is at the arrangement point Q. As to the coordinate axis, the top to bottom of the drawing sheet represents the Y-axis direction, and the left to right of the drawing sheet represents the direction of the X-axis.

Next in step S104, the position information and angle information of the respective standard normal vector for each standard normal vector groups b1 through b19 are determined. The position information is indicated by the coordinates from arrangement point Q of the Standard Object image S to the points p1 to p19 of the respective standard normal vectors b1 through b19. The angle information is indicated by, for example, the angle inclination of each standard normal vector b1 through b19 for the X-axis direction. However, if this angle information is over 180 degrees, then 180 degrees is subtracted from that angle.

The reason for this subtraction is as follows: If the density of, for example, the left and right sides of the object image to be recognized differs greatly, the density of the background image of the left and right side become reversed for the object image. This occurs when, for example, the color of the left side and right side of the background differs from each other, e.g. when one side is covered with a dark colored doormat and the other side is a bare light toned floor, etc. Generally, the normal vector group, due to the density difference in the background image and the object image, is set as vectors that are in the outward or inward direction with reference to the object image. Therefore, the vector direction of the normal vector on the left and right sides of an object image becomes an opposite direction. However in the above case, for example, the right half becomes outwards and the left half becomes inward, and the vector direction of the normal vector group of the left and right side points become the same. Accordingly, the angle information is considered as an angle up to a 180-degree angle.

The method to determine the position information and angle information will be described in more detail below.

Of the standard normal vector groups b1 through b19 shown in FIG. 6, 0 degrees (that is in the horizontal direction, or the X-axis direction in FIG. 6), for example, are chosen as the angle information. In this case, for the standard normal vector pointing in the direction in the 180 degree angle, 180 degrees is subtracted as described above and will be dealt as a standard normal vector pointing in the 0 degree angle. As a result, there are four standard normal vectors, b1, b5, b9 and b14 that are of the 0 degree angle.

Next, the position information of the respective standard normal vectors b1, b5, b9 and b14 is determined. In other words, the standard normal vector b1 is located three (3) pixels in the positive X-direction from the arrangement point Q to point p1 and is at a point where X=3 and Y=0. The standard normal vector b5 is located three (3) pixels in the negative X-direction from the arrangement point Q to point p5 and is at a point where X=−3 and Y=0. The standard normal vector b9 is located two (2) pixels in the negative Y-direction and ten (10) pixels in the positive X-direction from the arrangement point Q to point p9 and is at a point where X=10 and Y=−2. The standard normal vector b14 is located two (2) pixels in the negative Y-direction and ten (10) pixels in the negative X-direction from the arrangement point Q to point p14 and is at a point where X=−10 and Y=−2.

From the result above, these four position information (X=3, Y=0), (X=−3, Y=0), (X=10, Y=−2) and (X=−10, Y=−2) exist for the respective standard normal vectors b1, b5, b9 and b14 in which angle information is a 0 degree angle. In addition, the four position information (X=3, Y=0), (X=−3, Y=0), (X=10, Y=−2) and (X=−10, Y=−2) becomes information that is linked with the 0 degree angle information.

In the same way as described above, the position information of the standard normal vector group for the angle information up to the 180 degree angle is determined; and the angle information and the position information determined are linked. The thus obtained angle information and position information linking with the concerned angle information become the standard data.

Next in step S105, the respective standard data, which is comprised of the angle information and the position information linked with the angle information determined in step S104, are registered in the memory.

The standard data making process is thus completed.

In regards to the angle information, its value can be such a fixed range that the range from a 0 degree angle to a 180 degree angle is divided by, for example, 15 degrees, thus forming 12 ranges.

(b) Object Image Identifying Process

In the object image identifying process, as shown in the flowchart of FIG. 4, the image showing the object image O that is to be identified is inputted in a computer memory in step S201.

Figure 7:
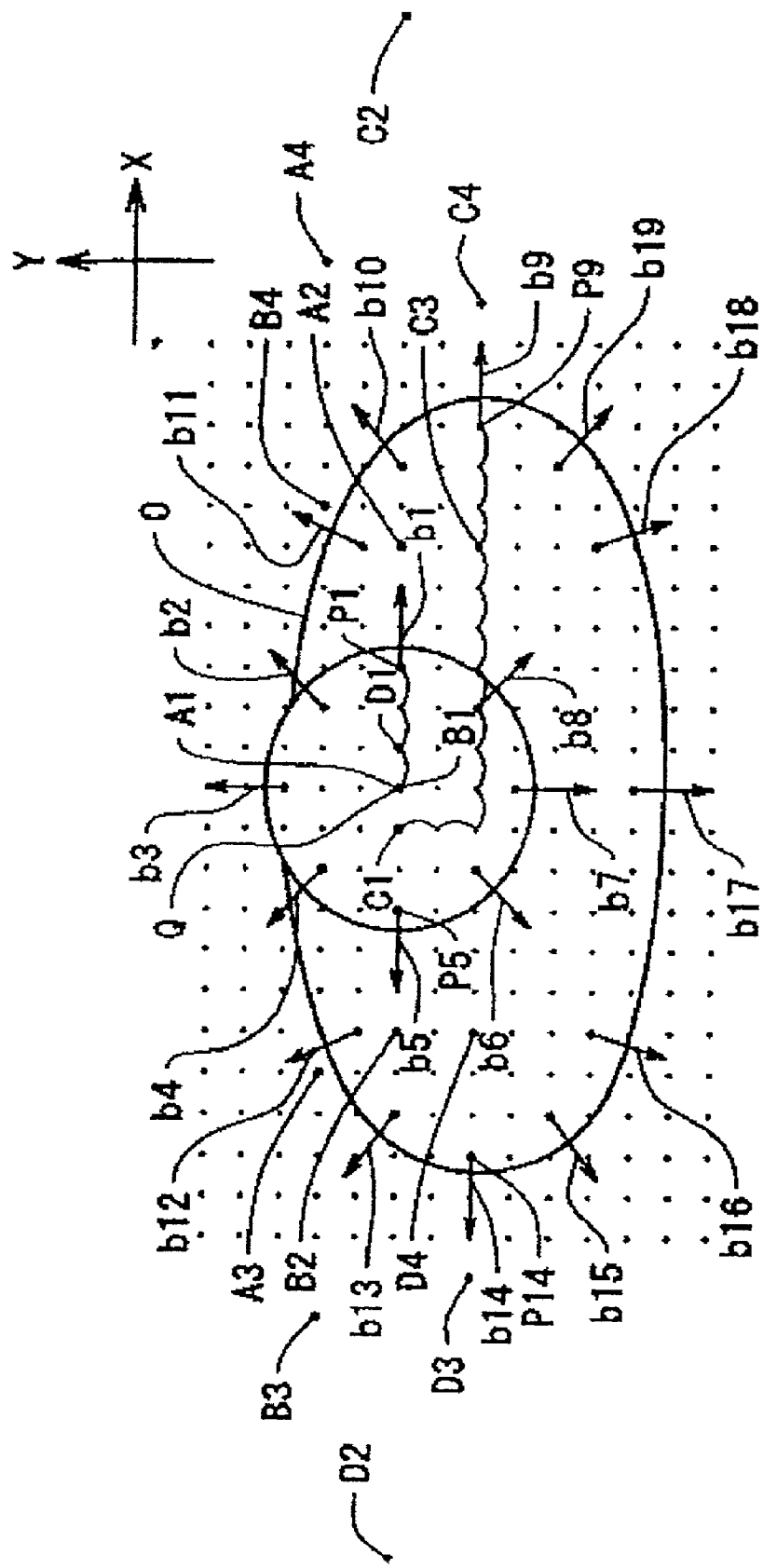
FIG. 7 shows the Answer point groups of the object image added.

Next in step S202, the normal vector group that originates only from the object image O in the input image is determined. Of the normal vector groups obtained from the input image, the normal vector groups in which vector direction does not change for a predetermined long period of time, approximately two (2) minutes, are considered that the normal vectors originate from the background image, and all the normal vector groups which do not change for a predetermined long period of time approximately two (2) minutes, are removed. In other words, the background image is obtained as a virtually stationary image which does not change; therefore, the vector direction of the respective normal vector group which originates from the background image does not change for a long period of time. Thus, all the normal vector groups originating from the background image are removed from the input image; and as a result, the normal vector groups b1 through b19 as shown in FIG. 7, which originate only from the object image O, are obtained.

Next in step S203, the Answer point groups of the normal vector groups that originate only from object image O are calculated. Here, the term "Answer point" refers to the arrangement point Q at the time the standard data is calculated. In addition, the calculation of the Answer point group is performed by an inverse operation of the calculation process of the standard data. More specifically, the calculation process is performed according to the angle information and position information of the standard data registered in step S105.

The calculation of each of the Answer points will be explained below using the normal vectors b1, b5, b9 and b14, in which the angle information is a 0 degree angle (that is a horizontal direction or the X-axis direction in FIG. 7), as an example. As described above, there are four position information (X=3, Y=0), (X=−3, Y=0), (X= 10, Y=−2) and (X=−10, Y=−2) which are linked with the 0 degree angle information. Therefore, as shown in FIG. 7, for all the normal vector groups b1 through b19 of the object image O that are in the horizontal direction (0 degree angle direction or 180 degree angle direction), the Answer point group is determined by performing an inverse operation of the four-position information. In other words, including the normal vectors pointing in the 180 degree direction as described above and the 0 degree angle normal vectors, four normal vector groups, b1, b5, b9 and b14, exist for the object image O shown in FIG. 7. On each of the points p1, p5, p9 and p14 of the four normal vectors b1, b5, b9 and b14, an inverse operation of the four position information (X=3, Y=0), (X=−3, Y=0), (X=10, Y=−2) and (X=−10, Y=−2) is performed so as to determine the Answer point groups. In other words, for the respective points p1, p5, p9 and p14, the respective points (Answer points) of −(X=3, Y=0), −(X=−3, Y=0), −(X=10, Y=−2) and −(X=−10, Y=−2) are determined.

More specifically, for the normal vector b1, four Answer points are placed; such four Answer points being: point A1 which is a point with three (3) pixels apart from point p1 in the negative X-direction according to −(X=3, Y=0), point A2 which is a point with three (3) pixels apart from point p1 in the positive X-direction according to −(X=−3, Y=0), point A3 which is a point with ten (10) pixels apart from point p1 in the negative X-direction and with two (2) pixels apart from point p1 in the positive Y-direction according to −(X=10, Y=−2), and point A4 which is a point with ten (10) pixels apart from point p1 in the positive X-direction and with two (2) pixels apart from point p1 in the positive Y-direction according to −(X=−10, Y=−2).

Likewise, for the normal vector b5, the Answer points are respectively placed on: point B2 according to −(X=3, Y=0), point B1 according to −(X=−3, Y=0), point B3 according to −(X=10, Y=−2), and point B4 according to −(X=−10, Y=−2), which are apart from point p5 respectively.

For the normal vector b9, the Answer points are respectively placed on: point C3 according to −(X=3, Y=0), point C4 according to −(X=−3, Y=0), point C1 according to −(X=10, Y=−2), and point C2 according to −(X=−10, Y=−2), which are apart from point p9 respectively.

Furthermore, for normal vector b14, the Answer points are respectively placed on: point D3 according to −(X=3, Y=0), point D4 according to −(X=−3, Y=0), point D2 according to −(X=10, Y=−2), and point D1 according to −(X=−10, Y=−2), which are apart from point p14 respectively.

The above respective Answer points can be placed by, for instance, raising the brightness value of the concerned point one level.

The calculation of the respective Answer points for all the normal vectors b1, b5, b9 and b14 that have angle information of 0 degrees is completed by the above operation. In the same way, the Answer point groups for every respective normal vector up to the 180 degree angle information is calculated by the position information which is linked with the angle information.

Next in step S204, the Answer point groups are evaluated.

This evaluation is performed in a region spaced, for instance, two (2) pixels apart, with the arrangement point Q as the center (this region is referred to as a "vector focus point region"). The evaluation is performed whether more than 40 percent of the Answer points (in this case 19 points) of points p of the normal vector group can be obtained or not. If the result of the evaluation determines that more than 40 percent of the Answer points exist in the vector focus point region, then it is judged that the object image O has the same identity (or the object image O is the same) as the Standard Object image S. On the other hand, if it is determined that it is below 40 percent, it is considered that the object image O does not have the same identity (or the object image O is not the same) as the Standard Object image S. Therefore, if the object image O is determined to be the identical with the Standard Object image S, then it is determined that the insert picture of object image O has an object image that has the same identity as the Standard Object image S. On the other hand, if it is considered that the object image O and Standard Object image S do not have the same identity, it is determined that the insert picture of object image O does not have an object image that has the same identity as the Standard Object image S.

Furthermore, by way of counting the number of existing vector focus point regions, the quantity of the existing object images O in the input image can be counted. In view of the fact that the calculation of the Answer point groups in step S203 is performed for all the points p in the input image, if a plurality of object images O exist in the input image regardless of the position, the vector focus point regions that correspond to such number of the object images are formed.

Second Embodiment

Generally, each part of the actual object image has different shapes; accordingly, the focus point region may not be formed properly or may include various noise information on the outline shape of the actual object image O shown in the picture and may not necessarily and completely match the Standard Object image S. Depending on circumstances when the match is not made, there is a possibility that the object image O may not be identified in the input image despite the fact that in the evaluation in step S204, an object image O with the same identity as Standard Object image S exists. For example, in the First Embodiment, when a human is chosen as an object image O to be recognized, the head and the upper body have different outline shapes, or the actual human frame may be bigger or smaller or may be holding a bag, etc. and may not necessarily match the Standard Object image S. While it is possible to form the standard data taking the noise situation of the actual human into consideration, there is a possibility that the amount of data becomes large and the image processing of the object image is time consuming.

Accordingly, in the Second Embodiment, the Standard Object image S is divided into two or more parts; and for each divided Standard Object image, a standard data is made. In addition, the Answer point group of every respective standard data is determined for one input image, and the object image is identified from the overall evaluation.

(a) Standard Data Making Process

Figure 8:
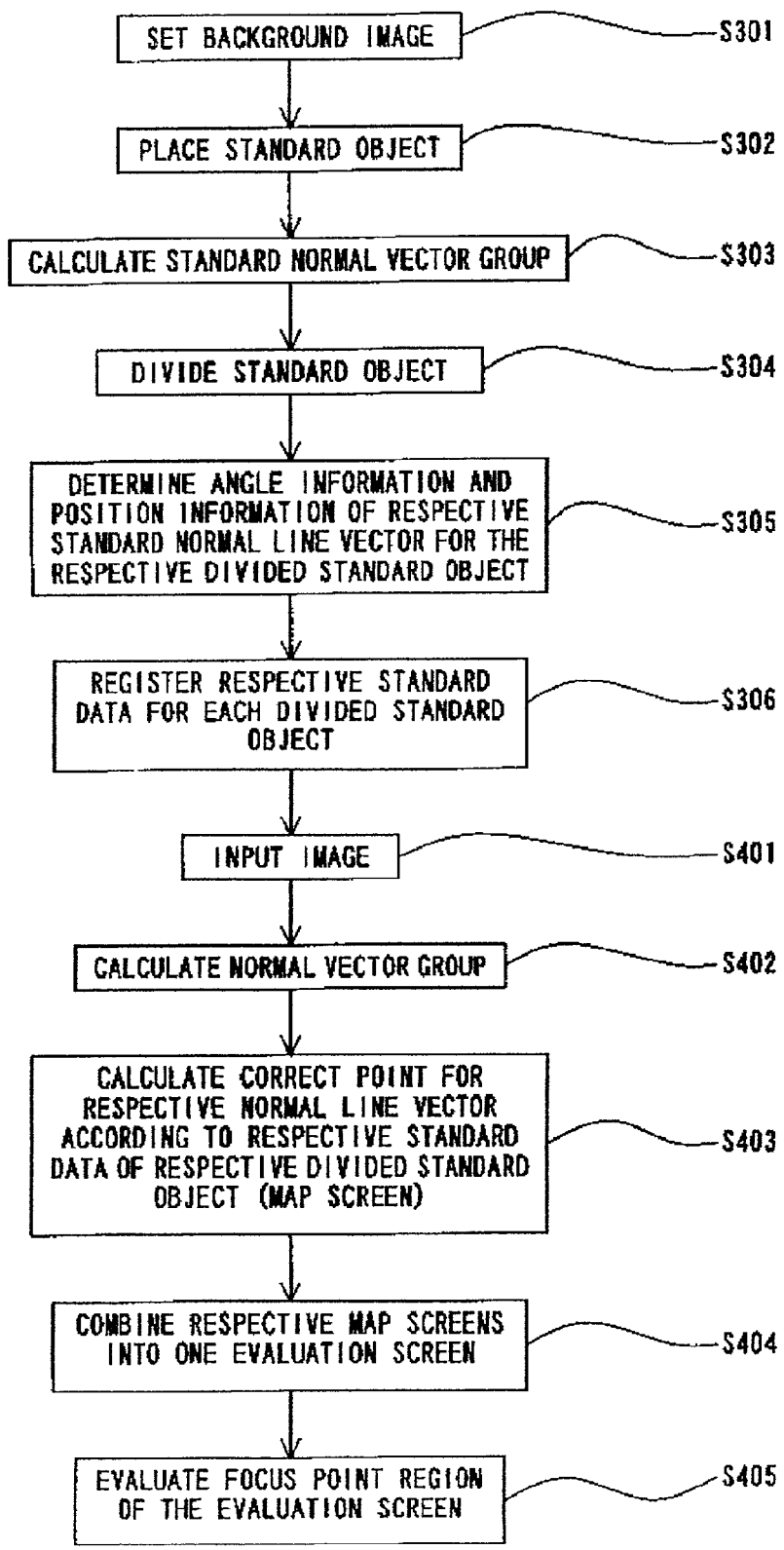
FIG. 8 is a flowchart showing the image processing procedure of the Second Embodiment.

As shown in the flowchart of FIG. 8, the Standard Data Making Process is performed in the same manner as in the First Embodiment; and first the background image is set (S301), next the Standard Object image is placed (S302), and the standard normal vector group is calculated (S303).

Figure 9A:
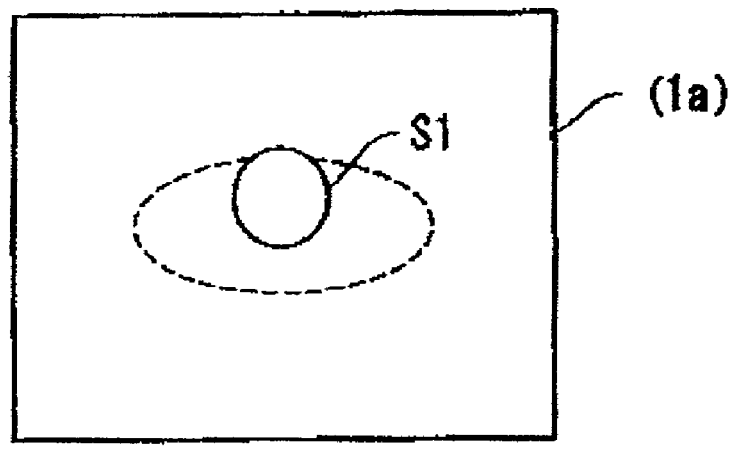
FIG. 9(a) is a diagram which shows the divided head.
Figure 9B:
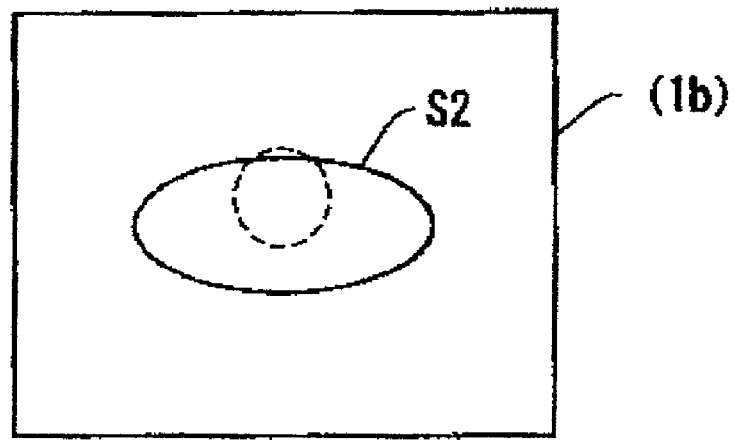
FIG. 9(b) shows the upper body of the Standard Object image.

Next in step S304, the Standard Object image S is divided into two or more parts. For example, as shown in FIGS. 9(a) and 9(b), the Standard Object image is divided into two parts, in which the first part is a divided Standard Object image S1 which is shaped as a head of a human (see FIG. 9(a)), and the second part is a divided Standard Object image S2 which is shaped as an upper body of a human (see FIG. 9(b)). The above division of the Standard Object S is performed in imaginary state in the data process.

Next in step S305, for each divided Standard Object S1 and S2, the position information and angle information of each standard normal vector group is determined. The position information and the angle information are determined by the same method as that described in the First Embodiment. More specifically, the position information is obtained by the coordinates from arrangement point Q of the Standard Object S to the points p1, p2 . . . of the respective standard normal vectors b1, b2 . . . ; and the angle information is obtained by, for example, the inclination angle of the respective standard normal vectors b1, b2 . . . for the X-axis direction; however, when the angle is over 180 degrees, 180 degrees is subtracted from the angle.

More specifically, in the divided Standard Object S1 shown in FIG. 10(a) which shows the head of a human, when the angle information is chosen, for example, as a 0 degree angle (the horizontal direction, or the X-axis direction shown in FIG. 10), then two standard normal vectors b1 and b5 exist. The standard normal vector b1 is located at the point (X=3, Y=0), which is a point moved three (3) pixels in the positive X-direction from the arrangement point Q to point p1. The standard normal vector b5 is located at the point (X=−3, Y=0), which is a point moved three (3) pixels in the negative X-direction from the arrangement point Q to point p5. Thus, the two position information (X=3, Y=0) and (X=−3, Y=0) become information that are linked with the 0 degree angle information.

In the same way, the position information of the respective standard normal vectors up to the angle information of a 180-degree angle is determined; and the angle information and the position information determined are linked together. The thus obtained angle information and position information linked with the related angle information becomes the standard data for the divided Standard Object S1.

On the other hand, for the divided Standard Object S2 that shows the upper body of the human in FIG. 10(b), when the angle information is chosen, for example, as 0 degrees (the horizontal direction, or the X-axis direction shown in FIG. 10), then two standard normal vectors b9 and b14 exist. The standard normal vector b9 is located at the point (X=10, Y=−2), which is a point moved two (2) pixels in the negative Y-direction and ten (10) pixels in the positive X-direction from the arrangement point Q to point p9. The standard normal vector b14 is located at the point (X=−10, Y=−2), which is a point moved two (2) pixels in the negative Y-direction and ten (10) pixels in the negative X-direction from the arrangement point Q to point p14. Thus, the two position information (X=10, Y=−2) and (X=−10, Y=−2) become information that are linked with the 0 degree angle information.

Using the same process as described above, the position information of the respective standard normal vectors, up to the angle information of a 180-degree angle, is determined; and the angle information and the position information determined are linked together. The thus obtained angle information and position information which are linked with the concerned angle information becomes the standard data for the divided Standard Object S2.

Next in step S306, the respective standard data are registered, the standard data consisting of: the angle information of the divided Standard Object S1 and S2 determined in step S305, and the position information which is linked with the angle information in the memory.

The standard data making process is thus completed.

In regards to the angle information, its value can be such a fixed range that the range from a 0 degree angle to a 180 degree angle is divided by, for example, 15 degrees, thus forming 12 ranges.

(b) Object Image Identifying Process

The object image identifying process is performed, as shown in the flowchart of FIG. 8, in the same manner as in the First Embodiment. In other words, the image is inputted (S401), and the normal vector group is calculated (S402).

Next in step S403, the Answer point group of every respective standard data is determined for the object image O, and the same number of screens (each referred to as a "MAP screen"), which determined the Answer point group for every standard data, are made. The Answer point group is determined in the same method as in the First Embodiment.

In other words, an inverse operation of the calculation process of the respective standard data registered in the step S306 is performed. FIG. 11 is a typical imaginary diagram (MAP screen 1) of the head of a human in the input image of the object image. FIG. 12 is a typical imaginary diagram (MAP screen 2) of the upper body of a human in the input image of the object image.

The calculation of the Answer point group for the object image O1 (human head) shown in FIG. 11 is done by performing an inverse operation of the two position information (X=3, Y=0) and (X=−3, Y=0) for every normal vector b1 and b5 (pointing in the 0 degree direction or 180 degree direction) in which the angle information is a 0 degree angle (which is the horizontal direction or the X-axis direction in FIG. 11). Thus, for the normal vector b1, two Answer points are placed on point A1, which is a point moved three (3) pixels from point p1 in the negative X-direction according to −(X=3, Y=0), and on point A2, which is a point moved three (3) pixels from point p1 in the positive X-direction according to −(X=−3, Y=0). For the normal vector b5, two Answer points are placed on point B2, which is a point moved three (3) pixels from point p5 in the negative X-direction according to −(X=3, Y=0), and on point B1, which is a point moved three (3) pixels from point p5 in the positive X-direction according to −(X=−3, Y=0).

With such operations as describe above, the calculation of the Answer point groups for the normal vectors b1 and b5 which angle information is 0 degrees is completed. In the same way, for all the normal vectors which angle information is up to a 180-degree angle, the Answer point groups are calculated based upon the position information that is linked with the angle information. In this way, a MAP screen 1 that shows the Answer point groups of the head of a human is formed (see FIG. 11. In the actual MAP screen 1, the upper body can be shown together with the head).

On the other hand, the calculation of the Answer point group for the object image O2, which is the upper body of a human shown in FIG. 12, is performed by, for example, performing an inverse operation of the two position information (X=10, Y=−2), (X=−10, Y= −2) for all the normal vectors b9 and b14 (pointing in the 0 degree direction or the 180 degree direction) of the 0 degree angle information (which is the horizontal direction or the X-axis direction in FIG. 12).

Thus, for the normal vector b9, two Answer points are placed on point C1, which is a point moved, from point p9, ten (10) pixels in the negative X-direction and two (2) pixels in the positive Y-direction according to −(X=10, Y=−2), and on point C2 which is a point moved, from point p9, ten (10) pixels in the positive X-direction and two (2) pixels in the positive Y-direction according to −(X=−10, Y=−2).

Also, for the normal vector b14, two Answer points are placed on point D2, which is a point moved, from point p14, ten (10) pixels in the negative X-direction and two (2) pixels in the positive Y-direction according to −(X=10, Y=−2), and on point D1, which is a point moved, from point p14, ten (10) pixels in the positive X-direction and two (2) pixels in the positive Y-direction according to −(X=−10, Y=−2).

The calculation of the Answer point group for every normal vector b9 and b14 in which angle information is 0 degrees is completed. In the same way, the Answer point groups are calculated for every respective normal vector up to the angle information of a 180-degree angle from the position information linked with the angle information. In this way, a MAP screen 2, which shows the Answer point groups for the upper body of the human is formed (see FIG. 12. In the actual MAP screen 2, the head can be shown together with the upper body).

Next, in step S404, the MAP screens 1 and 2 are combined into a single evaluation screen. Then, a screen (referred to as an "evaluation screen") in which the Answer point groups shown in MAP screen 1 that is for the head and the Answer point groups shown in MAP screen 2 that is for the upper body are overlapped is obtained (see FIG. 13). Thus, an evaluation screen is obtained in which the vector focus point region formed by the Answer point groups in MAP screen 1 and the vector focus point region formed by the Answer point groups in MAP screen 2 are overlapped.

Next in step S405, the thus obtained evaluation screen is evaluated.

The evaluation is performed in substantially the same way as step S204 in the First Embodiment. In other words, in the evaluation, it is determined whether or not such a situation is obtained in which equal to or more than 40 percent of the Answer points are gathered out of the number of points p in the vector focus point region (the region being, for instance, a region two (2) pixels spaced apart around the arrangement point Q) which is formed by the Answer point groups in the evaluation screen shown in FIG. 13. When in the evaluation it is determined that more than 40 percent of the Answer points exist in the vector focus point region, then it is judged that a part which matches the head of the divided Standard Object image SI exists, and a part which matches the upper body of the divided Standard Object image S2 exists for the inputted object image O. As a result, the object image O is judged so as to have both a head and an upper body; and therefore, the object image O has the same identity as the Standard Object image S, and therefore, the object image O is determined as a human.

On the other hand, when it is judged that the percentage of the Answer points in the vector focus point region is less than 40 percent, it is then judged that a part which matches the head of the divided Standard Object image S1 or a part which matches the upper body of the divided Standard Object image S2 does not exist in the inputted object image O. Thus, the object image O is judged so as not to have a head or an upper body. Thus, the object image O is not determined as a human since it does not have the same identity as the Standard Object image S.

In the First and Second embodiments, the evaluation is performed according to whether equal to or more than 40 percent of the Answer points gather in the vector focus point region. It is not limited to 40 percent, and the percentage can be set at an appropriate percentage. This is because different situations and other outside influences need to be considered including a case, for instance, in which the object image O is difficult to match with the prescribed form of the Standard Object image S or is easy to match.

Furthermore, the vector focus point region having an arrangement point Q as its center does not have to be limited to a region spaced two (2) pixels apart. With the object image to be recognized and the identifying precision, etc. into consideration, the range that has an arrangement point Q as a center or as a reference point can be set at an appropriate range.

Moreover, in the above-described embodiments, a human is described as the Standard Object image. The Standard Object image can be a vehicle, a vegetable, etc. so as to determine an object image that has the same identity.

In addition, in the above embodiments, the Standard Object image is a human and is viewed from above; however, it can be taken from the side or from an oblique direction. Moreover, the size of the Standard Object image S is not limited to a particular size; and children and adults can be the Standard Object image S in the present invention. In this case, various different standard data are formed based upon Standard Object images S of different sizes. In addition, a plurality of Standard Object images, for each divided plurality of Standard Object images with different sizes, etc., can be utilized as the divided Standard Object image as described in the Second Embodiment.

Furthermore, in the respective embodiments described above, the normal vector group for the outline portion of the object image is determined; instead, a tangent line group for the outline portion of the object image can be determined. In the case of determining the tangent line group, the angle information of the standard data, compared to the shown embodiments, shifts 90 degrees; and also the direction in which the tangent line is directed is in the range of a 180 degree angle, and the subtracting process becomes unnecessary. Still, the object image with the identity of the Standard Object image can be identified in the same way as in the shown embodiments.

In addition, the normal vector is determined from a phase, where a Fourier transformation is performed circularly. However, the present invention is not limited to this, and the normal vector can be determined by another known method. Also, the tangent line can be determined from a phase in which a Fourier transformation is performed circularly, and the tangent line can be determined by another known method instead.

What is claimed is:

1. A method for identifying an object image that uses a density difference between a background image and an object image in a picture, said method comprising the steps of:
   utilizing a method of obtaining a normal vector of the outline portion of an object image; by arranging points p at equal intervals on a picture, and for each respective point p, performing a fundamental wave Fourier transformation for each pixel value on the circumference of the circle which center is point p, and handling a phase obtained from said fundamental wave Fourier transformation as the normal vector of the outline portion of an object image;
   arranging a Standard Object image on a picture in which an arrangement point, which is an arbitrary point on said picture that shows a background image, is used as a reference point;
   determining a normal vector group on outline portions of said Standard Object image based upon density difference in said background image and said Standard Object image;
   determining an angle information of respective normal vectors and determining a position information from said arrangement point to said respective normal vectors of said normal vector group;
   storing said position information and angle information as standard data for said arrangement point;
   determining, for a picture that shows an object image to be recognized, a normal vector group on outline portions of said object image based upon density difference in said object image and a background image;
   determining a plurality of Answer point groups, that correspond to said arrangement points, from said normal vector group based upon said standard data; and
   evaluating a focus point region formed by said Answer point group.

2. The method for identifying an object image according to claim 1, wherein:
   said Standard Object image is divided into two or more parts, and the same number of standard data is formed for each divided Standard Object image;
   an Answer point group is determined for each one of said standard data for the object image to be recognized, and a plurality of screens in which said Answer point group are determined for every standard data are formed for the same number as said divided Standard Object image; and
   said respective plurality of screens are combined into an evaluation screen, and a focus point region formed by Answer point groups of said evaluation screen is evaluated.

3. The method for identifying an object image according to claim 1 or claim 2, wherein:
   determining normal vector of background image and storing information of said normal vector group originating from said background image; and
   said normal vector groups obtained from said picture that shows said Object image to be recognized, all of said normal vector groups which originated from said background image, are removed, and said Answer point group is determined from remaining normal vector groups.

* * * * *